United States Patent [19]
Bryan

[11] Patent Number: 6,044,698
[45] Date of Patent: Apr. 4, 2000

[54] METHOD AND APPARATUS INCLUDING ACCELEROMETER AND TILT SENSOR FOR DETECTING RAILWAY ANOMALIES

[75] Inventor: Michael A. Bryan, Los Gatos, Calif.

[73] Assignee: Cairo Systems, Inc., Los Gatos, Calif.

[21] Appl. No.: 09/201,324

[22] Filed: Nov. 30, 1998

Related U.S. Application Data

[63] Continuation of application No. 08/829,429, Mar. 31, 1997, abandoned
[60] Provisional application No. 60/014,701, Apr. 1, 1996.

[51] Int. Cl.$^7$ .................................................. E01C 23/00
[52] U.S. Cl. ............................................................. 73/146
[58] Field of Search ................................................ 73/146

[56] References Cited

U.S. PATENT DOCUMENTS

| | | | |
|---|---|---|---|
| 3,775,859 | 12/1973 | Sauterel | 33/338 |
| 3,940,597 | 2/1976 | DiMatteo | 235/150.2 |
| 4,027,840 | 6/1977 | Blair | 246/122 R |
| 4,071,282 | 1/1978 | Callahan et al. | 303/106 |
| 4,361,301 | 11/1982 | Rush | 246/34 R |
| 4,531,300 | 7/1985 | Heidel et al. | 33/366 |
| 4,599,620 | 7/1986 | Evans | 343/357 |
| 4,711,418 | 12/1987 | Aver, Jr. et al. | 246/5 |
| 4,741,207 | 5/1988 | Spangler | 73/146 |
| 4,768,740 | 9/1988 | Corrie | 246/2 S |
| 4,894,662 | 1/1990 | Counselman | 342/357 |
| 4,903,212 | 2/1990 | Yokouchi et al. | 364/449 |
| 4,924,402 | 5/1990 | Ando et al. | 364/449 |
| 4,989,151 | 1/1991 | Nuimura | 364/449 |
| 5,129,605 | 7/1992 | Burns et al. | 246/5 |
| 5,225,842 | 7/1993 | Brown et al. | 342/357 |
| 5,247,338 | 9/1993 | Danneskiold-Samsoe et al. | 356/1 |
| 5,341,683 | 8/1994 | Searle | 73/597 |

(List continued on next page.)

OTHER PUBLICATIONS

Vantuono, W., "Mapping New roles for GIS", Simmons–Boardman Publishing Corp. (1995), 5 pages.
Desai, C.S., et al., "Constitutive modeling of materials in track support structures" *Transportation Research Record* (1988) 939:10–18.
Dialog File 63:TRIS Abstract of Marowski, G., "Analysis of the mathematical model of the railway track bed" *Rail International* (1978) 9(6):397–431.
Graf et al., "Locating railroad rack bed subsurface defects utilizing nondestructive remote sensing technologies" *SPIE* (1994) 2245:188–195.
Hayre, H.S., "Automated railroad track inspection" *IEEE Transactions on Industry Applications* (1974) IA–10(3):380–384.

(List continued on next page.)

*Primary Examiner*—Joseph L. Felber
*Attorney, Agent, or Firm*—Townsend and Townsend and Crew LLP

[57] ABSTRACT

A technique for monitoring anomalies in a railway system 400. The technique uses a motion sensor 207, 209 operably coupled to a chassis of a rail car 101 to detect a possibility of an event which may correspond to an anomaly in the railway system. A global positioning sensor (GPS) 213 operably coupled to the chassis detects a geographical location of the rail car 101 at a time corresponding to the event, which correlates the anomaly to the geographical location and the time. The technique also uses a processor 301 operably coupled to the motion sensor 207, 209 to direct a signal corresponding to the event and a recorder 215 operably coupled to the processor 301 to log the signal which may correspond to the anomaly and the geographical location of the rail car corresponding to the event. A central station 104 tracks and analyzes the anomaly over time to predict a possible defect in the railway system.

37 Claims, 5 Drawing Sheets

U.S. PATENT DOCUMENTS

| | | | |
|---|---|---|---|
| 5,344,105 | 9/1994 | Youhanaie | 244/3.14 |
| 5,386,727 | 2/1995 | Searle | 73/602 |
| 5,433,111 | 7/1995 | Hershey et al. | 73/593 |
| 5,475,597 | 12/1995 | Buck | 364/443 |
| 5,488,558 | 1/1996 | Ohki | 364/449 |
| 5,491,486 | 2/1996 | Welles, II et al. | 342/357 |
| 5,579,013 | 11/1996 | Hershey et al. | 342/357 |
| 5,610,815 | 3/1997 | Gudat et al. | 364/424.027 |
| 5,627,508 | 5/1997 | Cooper et al. | 340/425.5 |
| 5,719,771 | 2/1998 | Bock et al. | 364/443 |
| 5,721,685 | 2/1998 | Holland et al. | 364/449.1 |
| 5,731,997 | 3/1998 | Manson et al. | 364/559 |

OTHER PUBLICATIONS

Huang, Y.H., et al., "Hot–mix asphalt railroad trackbeds" *Transportation Research Record* (1986) 1095:102–110.

Jirsak, Z., "Vertical effects of vehicles on the bed " *DET Eisenbahntechnik* (1977) 25(4):166–169. An English abstract from Dialog File 63:TRIS is attached.

Lancaster, T., "Erosion and sediment control on a light railway system" *Public Works* (1993) 124(7):60.

Product brochure for Trimble PC Vtrak™ Vehicle Tracking Software, Vehicle Tracking & Communications Products, 645 North Mary Avenue, Post Office Box 3642, Sunnyvale, CA 94088, 2 pages total.

Product brochure for Series 0711 and Series 0713 Proportional Non–linear sensor, The Fredericks Company, 2400 Philmont Avenue, P.O. Box 67, Huntingdon Valley, PA 19006, 2 pages total.

Product brochure for Endevco Model 7290A Variable Capacitance Accelerometer, Endevco Corporation, 30700 Rancho Viejo Road, San Juan Capistrano, CA, 92675, 1 page total.

Product brochure for Placer ™ GPS 300 Compact 6–Channel GPS Sensor & Antenna, Vehicle Tracking Products Division, 645 North Mary Avenue, Post Office Box 3642, Sunnyvale, CA 94088, 2 pages total.

Product brochure for SVeeSix Series 6–Channel GPS Receivers, OEM Sales, 645 North Mary Avenue, Post Office Box 3642, Sunnyvale, CA 94088, 2 pages total.

Profillidis, V.A., et al., "Elastoplastic study of the behavior of a railway track and its bed using the method of finite elements" *Bulletin de Liaison des Laboratories des Ponts et Chaussees* (1986) 141:18–19. An English abstract from Dialog File 8:Ei Compendex Plus is attached.

Profillidis, V.A., "Three–dimensional elasto–plastic finite element analysis for track end structures" *Civil Engineering for Practicing and Design Engineers* (1985) 4(9):685–701.

Profillidis, V.A., "Applications of finite element analysis in the rational design of track bed structures" *Computers and Structures* (1986) 22(3):439–443.

Weil, G.J., "Non–destructive, remote sensing technologies for locating subsurface anomalies on railroad track beds" Proceedings of the International Society for Optical Engineering (1995) 2458:74–81.

Xuejun, D. "Computer analysis of stresses and strains in railway track structures" Proceedings of the Second International Conference on Computing and Civil Engineering (1985) Science Press, Beijing, China, Elsevier, Amsterdam, pp. 834–844.

METHOD AND APPARATUS INCLUDING ACCELEROMETER AND TILT SENSOR FOR DETECTING RAILWAY ANOMALIES

CROSS-REFERENCE TO RELATED APPLICATIONS

This application is a continuation of and claims the benefit and priority of U.S. application Ser. No. 08/829,429, filed Mar. 31, 1997, now abandoned which claims the benefit and priority of U.S. Provisional Application Ser. No. 60/014,701, to Michael A. Bryan, filed Apr. 1, 1996, which are herein incorporated by reference for all purposes. Application Ser. No. 08/829,429 was filed concurrently with Ser. Nos. 08/829,771, 08/829,008, and 08/828,469, which are hereby incorporated by reference for all purposes.

This present invention relates to a technique for monitoring activity on mobile vehicles. More particularly, the invention is illustrated in an example related to monitoring rail track defects using a locatable rail car coupled to motion sensors.

The fixed rail transportation industry has been around in the United States since the industrial revolution. This type of transportation is used extensively today in moving both cargo and people from one geographical location to another geographical location. In the United States, numerous rail companies move millions of pounds of cargo, and thousands or even millions of people, throughout the continental United States yearly. In more densely populated countries such as Japan, "bullet trains" are used extensively to transport people from a busy metropolitan area such as Tokyo to Osaka or the like. In France, high speed rail systems such as the TGV continue to become more important as the population of the country increases. As such, there are literally thousands or even millions of miles of railroad tracks traversing the United States, among numerous other countries.

These railroad tracks, however, must be routinely inspected to prevent a possibility of track failure. Track failure often occurs by way of soil and gravel displacement, or erosion of timber that is used underlying the railroad tracks, for example. Unfortunately, track failure occurs at an alarming rate, which often leads to significant property damage and even death, in some cases.

In the United States, for instance, there are literally thousands of train related accidents due to track failures yearly. Literally tens of thousands of people are affected by way of environmental contamination caused by derailing train cars from track failure. Property damage caused by track failure is often in the millions of even billions of dollars yearly.

An article in the Los Angeles Times headlined "Tragedy on the Rails." This article stated that an eight car train carrying dangerous chemicals plunged from the rails and exploded in flames before dawn hurling a noxious cloud into the sky which forced the closing an interstate highway. Two bodies were found near the derailed train. A monstrous fire, throwing flames 600 to 800 feet in the air, burned bad and high causing significant damage to person and property. This article is merely one example of the type of damage caused by track failure.

Accordingly, industry has proposed some techniques in an attempt to prevent track failure. One of these techniques is to merely perform a visual inspection of the track during maintenance rounds. This visual inspection often involves railroad workers that walk down the track and visually look for possible track failures. This technique often requires large human capital and is not generally efficient for predicting the behavior of railroad tracks in a routine manner.

Other techniques have been proposed to detect certain defects in a rail way system using sensors. These techniques are, however, limited. In particular, they can only provide information for chronic or severe defects, which must be repaired immediately. These sensors are essentially "dumb" and cannot really be used to predict the future behavior of the railway system. Additionally, the techniques are generally in terms of providing sensing techniques for the rail car unit itself, similar to sensors used to track engine oil pressure, temperature, and the like. Accordingly, there are simply no effective techniques for identifying potential defects in the railroad assembly.

From the above, it can be seen that a technique for identifying potential defects on a railway system is often desirable.

SUMMARY OF THE INVENTION

According to the present invention, a technique including a device and method for detecting anomalies in a railway car system is provided. The present technique uses a sensing device including a tilt sensor and an accelerometer coupled to a global positioning sensor for detecting a presence of anomalies in a moving rail car vehicle.

In a specific embodiment, the invention provides a device for monitoring anomalies in a railway system using a unique sensing device. The device includes motion sensors, including a tilt sensor and an accelerometer operably coupled to a chassis of a rail car to detect an event, which is, for example, a sudden change in rail car acceleration and/or angle caused by a defect in the railway. The event may correspond to an anomaly (e.g., broken track, displaced gravel, weak rail tie cracked track), which tends to cause the railroad track to "give" as the weight or load of the rail car traverses over the anomaly. The device also includes a global positioning system sensor (GPS) operably coupled to the chassis to detect a geographical location of the rail car corresponding to the event. A processor is operably coupled to the motion sensor to direct a signal corresponding to the event. The processor is also operably coupled to the GPS sensor to direct the geographical location corresponding to the event of the rail car. A recorder is operably coupled to the processor to log the signal which may correspond to the anomaly and the geographical location of the rail car.

In an alternative specific embodiment, the present invention provides a method for detecting anomalies in a railway system. The method includes detecting an event from a moving rail car using a motion sensor having a tilt sensor. The event may correspond to an anomaly, such as a broken track, displaced gravel, weak rail tie cracked track, which tends to cause the railroad track to "give" as the weight or load of the rail car traverses over the anomaly. The motion sensor is operably coupled to a chassis of the moving rail car. The method also has a step to transmit an event signal corresponding to the event from the motion sensor to a recorder, and to transmit a location signal to the recorder a track location of the event. The track location is a geographical location from a global positioning sensor (GPS) operably coupled to the chassis.

In yet another alternative embodiment, the present invention provides a method for tracking rail car vehicle, where the method for tracking includes a method for retrofitting a tracking device onto a rail car. The tracking device has a housing having a flange, a motion sensor having a tilt sensor and a linear accelerometer operably coupled to the housing.

A global positioning system sensor (GPS) is operably coupled to the housing. A processor is operably coupled to the motion sensor and coupled to the GPS sensor. The method then installs the tracking device onto a chassis of a rail car by attaching the flange to the rail car. This method provides an easy procedure for attaching a tracking device onto a conventional rail car.

Numerous benefits are achieved over pre-existing techniques using the present invention. In particular, the present invention provides a unique sensor arrangement for detecting anomalies over time in a railway system using a moving rail car. This technique can be implemented in conventional rail cars using simple bolt-on tools, which allow for easy retrofitting of conventional rail cars. Additionally, the unique sensor arrangement provides automatic logging of events over time which may correspond to anomalies in an easy and accurate manner, without the use of human railway workers, who must generally walk down the rail track to identify possible defects thereon.

Furthermore, the present invention substantially reduces or even eliminates any subjectivity of analyzing a defect, which is often present using conventional human inspection techniques. Moreover, the present invention provides data to railway workers who can repair or replace possibly damaged sections of railroads to prevent the occurrence of accidents that can cause damage to railroad equipment, environment, and human beings, in some cases. Accordingly, the present invention uses the unique sensing device and tracking system for overcoming defects in present railway systems, thereby saving costs related to damage, possible damage to the environment from accidents, and human lives. These benefits and others are further described throughout this specification.

The present invention achieves these benefits in the context of known process technology. However, a further understanding of the nature and advantages of the present invention may be realized by reference to the latter portions of the specification and attached drawings.

DESCRIPTION OF SPECIFIC EMBODIMENTS

Figure 1:
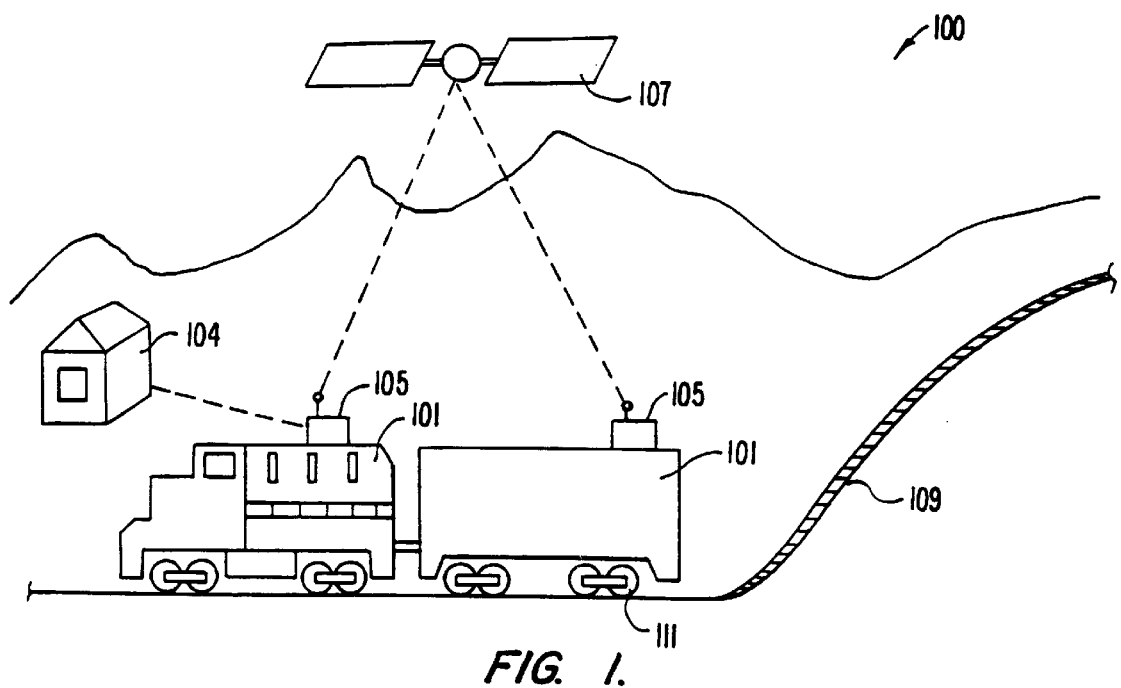
FIG. 1 is a simplified diagram of a rail car monitoring system according to the present invention.

FIG. 1 is a simplified diagram of a rail car system 100 according to the present invention. This diagram is merely an illustration and should not limit the scope of the claims herein. One of ordinary skill in the art would recognize other variations, modifications, and alternatives.

The rail car system 100 includes a variety of elements such as a rail car(s) 101, a tracking station 104, a tracking device(s) 105, a satellite 107, among other elements. As shown, the rail car 101 connects to one or more cars in a conventional manner and traverses along a track 109. In common terms, the connection of various rail cars as a unit is referred to as a train. The train often include a locomotive or engine car, which pulls or provides power to other car units. Storage cars connect to the engine car for carrying goods, chemical, people, and the like from one track location to another track location. A caboose connected to the end oversees the train operation.

Each rail car 101 includes typical elements such as ground wheels 111, which can run along track 109. The rail car 101 travels along railroad tracks found in almost any country and state. The rail car 101 also includes a tracking device 105, which monitors a variety of information derived from the rail car and the track. The tracking station 104 stores and analyzes the information derived from the tracking device on the rail car over time.

Figure 1A:
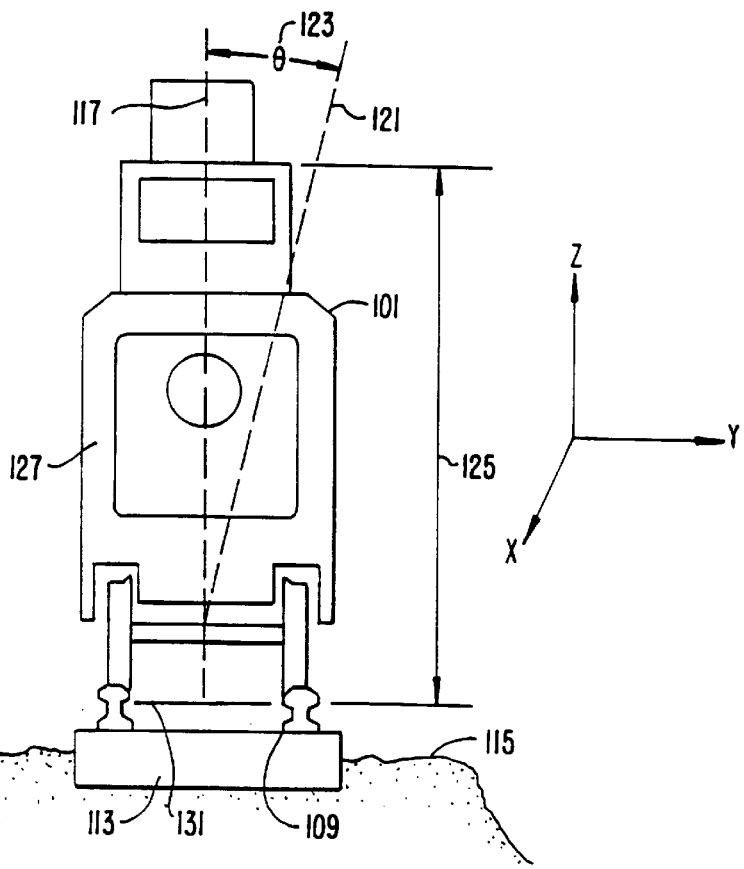
FIG. 1A is a simplified front-view diagram of the rail car of FIG. 1 according to the present invention.

FIG. 1A is a simplified front-view diagram of the rail car of FIG. 1 according to the present invention. This diagram is merely an illustration and should not limit the scope of the claims herein. This diagram is shown to illustrate the changes in acceleration and angle that the rail car undergoes when the rail car travels over an anomaly (e.g., broken track, displaced gravel, weak rail tie, cracked track) in the railroad track.

The rail car 101 traverses along track 109, which is placed on a railroad tie 113. Railroad tie 113 is provided on a bed of gravel 115 or the like. This gravel is often called packing. As the railroad tie or packing becomes defective, the rail car flexes the track portion with the anomaly, which deflects the rail car 101 in an angle θ 123 between a line 121 relative to a z-axis 117. The tracking device 105 includes a motion sensor that can detect the angle 123 and relative acceleration of the rail car 101. As the railroad tie 113 or packing 115 becomes even more defective, the angle of deflection or rail car acceleration can become even greater, which may indicate even a higher probability of track failure or the like.

Rail car variables are kept at relatively constant values as the rail car travels over the track section with the anomaly so that the motion sensor detects any slight changes to the anomaly over time. These variables include, among others, a speed of the rail car, weight of the rail car, sensor or tracking device placement (e.g., height and position relative to the underlying track). In a preferred embodiment, the tracking device 105 is mounted onto the rail car which has a relatively constant mass 127 relative to other trains and over time. An example of a constant mass car is the locomotive. In most cases, the weight of the locomotive is generally constant, except for the weight of the fuel. The constant mass car provides a similar ride for the motion sensor or the tracking device. Accordingly, the rail car should experience greater movement only as a result of more severe damage to the underlying railroad assembly having the anomaly.

Preferably, the tracking device is placed near a top region of a locomotive, which allows for easier transmission of data from the tracking device to a wireless network, for example. In addition, the top of the locomotive has the greatest relative movement as compared to other car locations, which tends to provide better movement data. In other embodiments, the motion sensor is placed near the top region of the locomotive or other relatively constant mass cars. The tracking device or motion sensor should be placed at a certain height 125 and location 131 relative to the underlying railroad regardless of the type of rail car being used. This allows the tracking device to experience a similar height 125 and placement 131 environment regardless of the rail car.

Additionally, the rail car travels along a selected area of the railroad assembly, which has the anomaly, within a relatively constant speed range. This speed range should not vary greatly to provide accurate motion measurements based upon any change in the anomaly itself. The speed range should not vary greater than about a few miles per hour. A relatively constant speed range tends to ensure that the motion detector senses any change in the anomaly over time, which is independent of the speed of the rail car.

Figure 2:
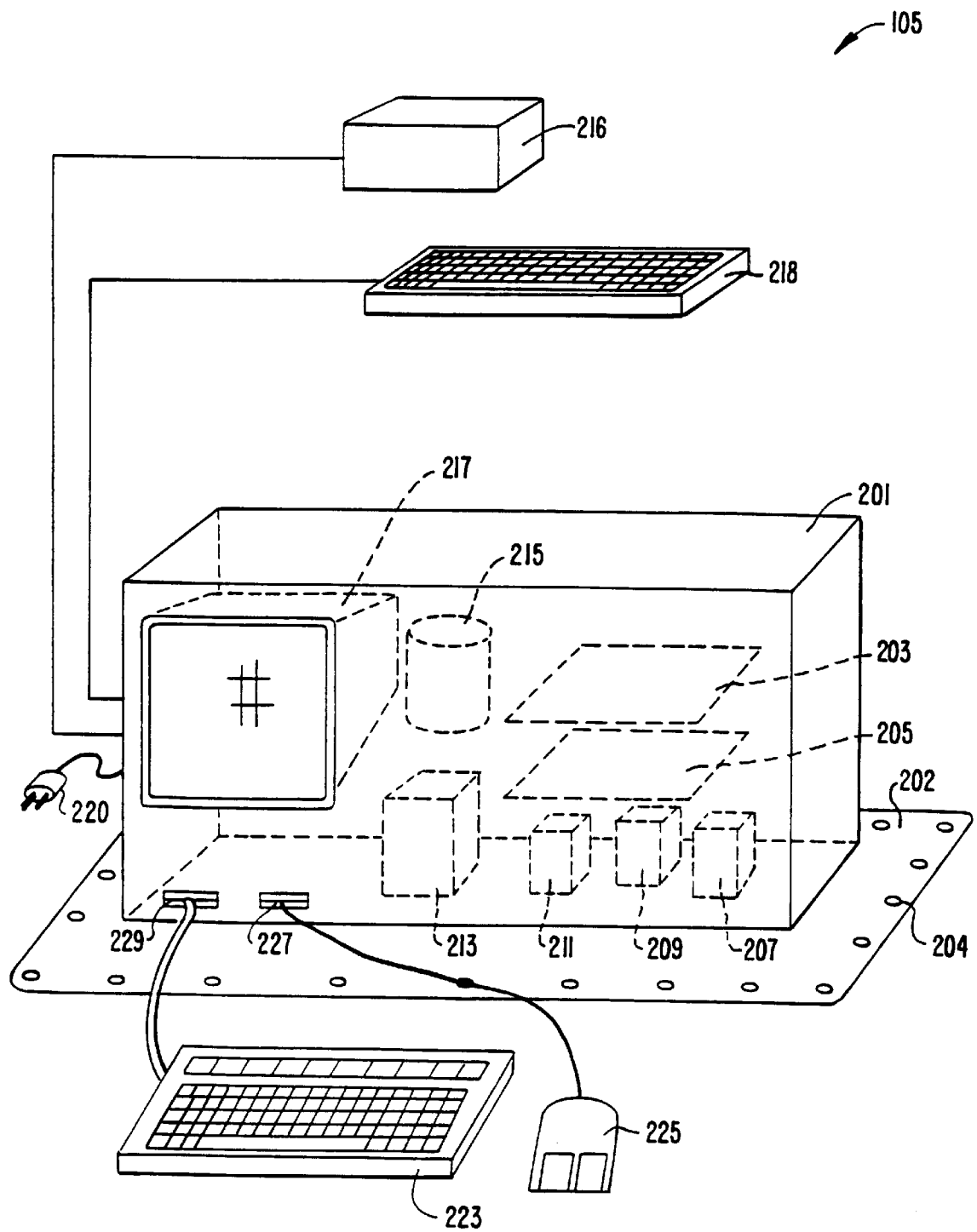
FIG. 2 is a simplified diagram of a device for the rail car of FIG. 1 according to the present invention.

FIG. 2 is a simplified diagram of a tracking device 105 according to the present invention. This is merely an example of a tracking device, which should not limit the scope of the claims herein. The tracking device 105 includes a housing 201. The housing 201 is made from a material that is suitable for use in an environment outside the rail car. The housing 201 can be made of a plastic or steel with sufficient resistance to weather and foreign objects, which can impact the housing 201 while the rail car traverse down the railroad track. The housing 201 is provided upon a flange 202, which includes a plurality of bolt holes 204 for fastening to an upper portion of the rail car. The flange 202 and bolt-on aspects of the housing allows for easy placement and removal of the tracking device 105 from the rail car for repair or analysis purposes.

The housing includes a variety of electronic elements, which are used for tracking information derived from the moving rail car unit. These electronic elements include an accelerometer 207 operably coupled to an interface board 205, which is coupled to a central processing board 203. The accelerometer 207 provides rail car movement information to the central processing board 203 from the moving rail car. The movement information includes sudden changes in rail car acceleration, shock motion experienced by the rail car, and rail car vibration, in some cases. The movement information derived from the accelerometer can be sent to a memory 215 or logging device in housing 201, or sent to an outside user through a radio modem 211, which transmits the movement information via a wireless communication network.

As merely an example, the accelerometer may utilize variable capacitance microsensors. The accelerometer is designed for measurement of a relatively low level acceleration in a rail car unit in a railway system. The accelerometer also can detect sudden shock motion, constant acceleration, and even vibrations from the rail car unit caused by the rail car or an anomaly in the track. A product available which has these features is a variable capacitance accelerometer sold under the name of Endevco Model 7290A. This accelerometer can operate from 9.5 V to 18.0 V and provide a high level, low impedance output. A +/−2 volt differential output is dc coupled at a dc bias of approximately 3.6 volt. Frequency response is controlled by near-critical damped sensors. The use of gas damping results in a small thermally-induced change from frequency response. Again, the Endevco Model 7290A is merely an example, and should not limit the scope of the claims herein.

The tracking device 105 also includes a tilt sensor 209, which provides angular movement information to the central processing board 203 through the interface board 205. Similar to the information from the accelerometer, the angular movement information can be transferred to memory 215 for logging purposes, or sent to an outside user through the radio modem 211. A tilt sensor is generally a proportional non-linear sensor. The tilt sensor should be able to detect slight changes in angle, which ranges from about 0 to about 2 degrees from a position normal to gravity. In certain embodiments, the tilt sensor should be operable in a range from about 0 to about 5 degrees.

The tilt sensor also should be able to operate in a variety of ambient conditions. In particular, the tilt sensor should operate in a temperature range from about −55 to about 100° C., which is much greater than temperatures encountered by a typical rail car unit. In most cases, however, the tilt sensor operates in a temperature range from about −55 to about 55° C. A characteristic time associated with the tilt sensor should be able to allow the meter to recover from changes in the tilt sensor angle. The characteristic time is preferably less than about 1 second and more preferably less than about 0.5 second. An output from the tilt sensor can be in voltage units or the like, depending upon the application. An example of a tilt sensor is a product sold by the Fredericks Company. This product is commonly referred to as a "single axis sensor." This sensor comes in Series 0711 and 0713 designs, which provide for proportional non-linear sensing.

A global positioning system sensor (GPS) 213 is provided in the tracking device 105 to track a global position of the tracking device or of the moving rail car. GPS 213 includes a GPS transceiver 216, among other elements. GPS 213 provides location information (e.g., longitude and latitude) to the central processing board 203 through the interface board 205. The location information is generally stored in memory 215, or transmitted to an outside user using the radio modem 211.

As merely an example, the GPS can be a product sold under the tradename of Placer™ GPS 300 made by Trimble Navigation. The GPS is a low-cost and high performance receiver and antenna. It is sufficiently rugged and lightweight, and housed all in a single package. The GPS mounts on both flat and curved surfaces, which may be ideal for the rail car. The GPS includes a standard RS-232 interface that outputs vehicle location messages in ASCII characters. Six channels allow for continuous tracking of the moving rail car. Output data includes a latitude, a longitude, a speed, a time, and a travel direction (e.g., north, south, east, west). Data acquisition time is less than two seconds in most cases. Position data can be updated once per second. Data can be transferred at baud rates of 300, 600, 1200, 2400, 4800, 9600, and others. Positional accuracy is within 2–5 meters under steady state conditions and about 15 meters under non-steady state conditions.

The GPS 300 can operate under a variety of conditions. For instance, it operates in a −40° C. to 70° C. temperature range. A non-operating temperature range is −55° C. to 85° C. The GPS can experience a shock of about 30 grams for 6 milliseconds. Operation also occurs in altitudes ranging from about −400 to +5,000 meters relative to sea level. Humidity can be 98%/66° C. The GPS is also generally weather-proof and dust proof, which are desirable features.

Power to the tracking device 105 is provided by way of various power sources. In particular, a photovoltaic array 218 may provide power to some of the electronic elements described above. The rail car also provides power to the tracking device 105 using a standard connection device 220. Optionally, the tracking device 205 includes a backup battery power supply for times when the main power sources are not available. Additionally, the battery power supply allows for the removal of the tracking device without any loss of information from memory 215.

A display 217 is coupled to the central processing board 203 through the interface board 205. The display can be a flat panel display or a cathode ray tube-type display. In preferred embodiments, the display is a flat panel display, which is generally more durable and resistant to the natural environment. The display is used to output information from the memory 215 and to program software for the present methods, which will be described in more detail below.

A keyboard 223 allows a user to access memory 215 of the tracking device 105 through the central processing board 203. Optionally, a mouse 225 is used to access information from memory 215 through the central processing board 203. The keyboard 223 and mouse 225 are easily connected to the tracking device 105 by way of ports 229 and 227, respectively. These ports are generally sealed to prevent foreign contaminants (e.g., water, dust, dirt) from entering housing 201 while the rail car is in operation.

Figure 3:
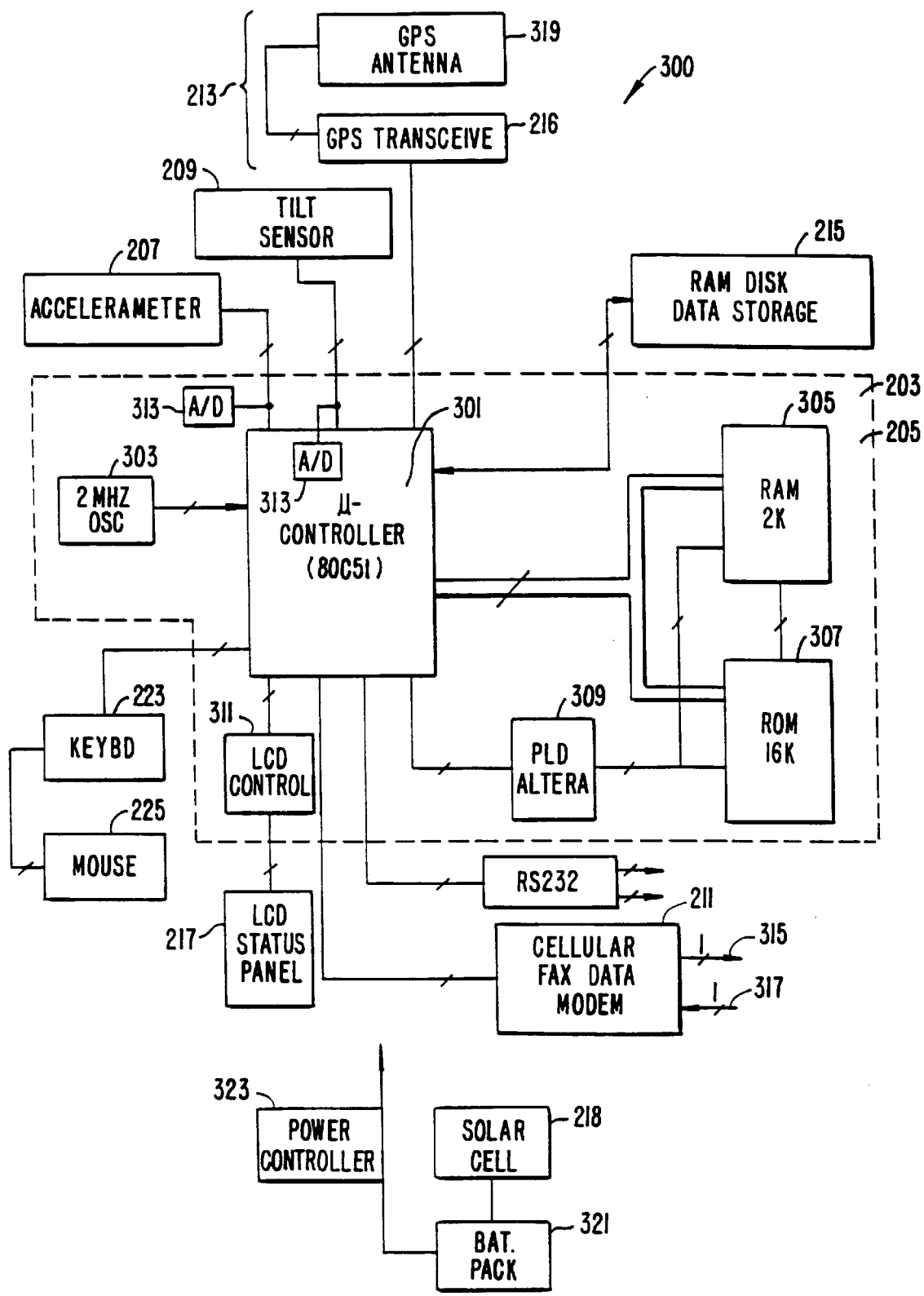
FIG. 3 is a more detailed block diagram of hardware for the device of FIG. 2 according to the present invention.

FIG. 3 is a more detailed block diagram 300 of hardware for the tracking device according to the present invention. This block diagram is merely an illustration and should not limit the scope of the claims herein. One of ordinary skill in the art would recognize other variations, modifications, and alternatives.

The block diagram 300 includes numerous common elements to the ones described in FIG. 2, for example. Many of these elements are referenced using the same numerals for easy reading and cross-referencing. As shown, the block diagram includes devices, which would be found on the central processing board 203 and interface board 205. For instance, the central processing board 203 would include a microprocessor 301.

Microprocessor 301 is connected to a clock or oscillator 303 for providing clock signals to the microprocessor 301. A variety of memory chips, including a random access memory chip 305, a read only memory chip 307, and a programmable logic chip 309, are connected or coupled to the microprocessor 301. An LCD controller chip 311 interfaces between the microprocessor and display 217, which is an LCD panel in this embodiment. The RS-232 port is coupled to the microprocessor. The keyboard 223 and mouse 225 are also coupled to the microprocessor. Additionally, the accelerometer 207 and the tilt sensor 209 are coupled to the microprocessor 301 through A/D converters 313, which change the analog signals from these devices into digital.

Modem 211 is a cellular facsimile and data modem, which is connected to the microprocessor 301. Modem 211 transmits 315 and receives 317 signals from a user at a tracking station or central processing office, for example. These signals include data related to time, location (e.g., latitude and longitude), speed, direction, acceleration, tilt, and others. Additionally, control signals may be transmitted and received from the modem 211.

The GPS sensor, including a transceiver 216 and antenna 319, are coupled to the microprocessor 301. Power is provided to the above devices using the photovoltaic array or solar cell 218. Backup battery power is provided using a battery power source 321. To ensure that the power is maintained reliably, a power controller 323 interfaces between the power sources and the devices, e.g., microprocessor, memory. Data storage is provided using a memory 215 in the form of a random access memory disk data storage unit.

Figure 4:
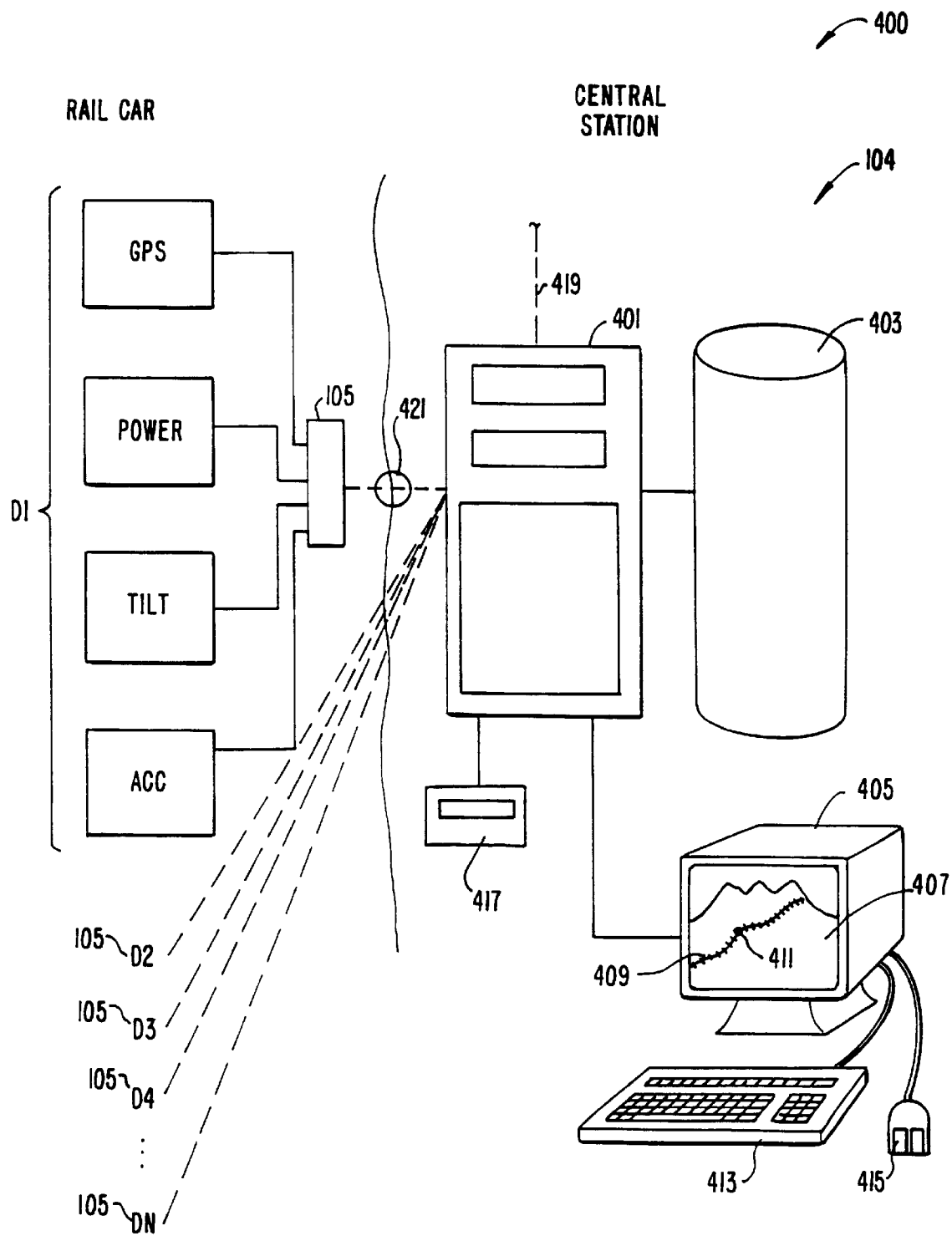
FIG. 4 is a block diagram of the rail car monitoring system according to the present invention.

FIG. 4 is a block diagram of a rail car monitoring system 400 according to an alternative aspect of the present invention. The rail car monitoring system 400 includes 400 a plurality of tracking devices (D1, D2, D3, D4 . . . DN) 105, the tracking station or central processing facility 104, among other features. This diagram and merely an illustration and should not limit the scope of the claims.

Each of the tracking devices 105 is fitted onto a rail car such as the one described. The rail car traverses successively along a railway route depending upon the train schedule. The tracking device monitors rail car information as the rail car traverses along the track. Each of the rail cars provide rail car information about a selected section of track and time to the tracking station, which records and analyzes the rail car information over time.

The tracking station 104 receives the rail car information from the tracking device in each rail car 105 through a variety of techniques. In particular, the tracking device transmits the rail car information via modem directly to the tracking station in a continuous or in-situ manner. Alternatively, the tracking device transmits the rail car information directly to the tracking station in a periodic manner, e.g., time, location, amount of data. Alternatively, the tracking device stores the rail car information within memory, which will be stored there until the information is transferred at the tracking station 104. Alternatively, the tracking device transmits the rail car information through a depository 421, which is in communication with the central office 104. The depository 421 can be defined along the railway system and transmits the rail car information via a communication network such as a satellite network, a wireless network, a wide area network, a cellular network, the Internet, and the like to the tracking station 104.

Tracking station 104 includes a large processing device 401, which processes a large quantity of rail car information from the numerous rail cars in tracking devices in the railway system. The large processing device is often a main frame computer such as a UNIX machine, a high end workstation, or a personal computer, in some cases. The processing device 401 stores the rail car information in a storage device 403. The storage device 403 can be in the form a disk storage (e.g., RAID), a floppy storage, a tape storage, CD ROM, or the like. The storage device 403 preferably has sufficient memory capability and is easily upgradable for higher levels of memory. Rail car information can be output from the storage device 403 through the processing device 401 to a printer 417 or other output devices. A user interface in the form of a display 405 is coupled to the processing device 401. The user interface also includes a keyboard 413 and a mouse 415.

The processing device 401 accesses specialized software that analyzes the rail car information to identify a potential defect in the railway system, e.g., track. The defect can be defined as an anomaly in the track or track assembly that requires at least a detailed inspection of the track and may require repair of the track to prevent a possibility of track failure. In an embodiment, the processing device 401 displays the defect in the form of an icon 409 on a computer aided map 407, which displays the icon based upon latitude and longitude data 411 from the GPS sensor. The processing device 401 can also be coupled to a common wide area network 419 using a TCP/IP transmission scheme. Further techniques using the rail car monitoring system are described below and illustrated by way of FIGS. 5–6.

A method according to the present invention may be briefly outlined as follow:

1. Provide a tracking device on a rail car;
2. Move rail car in standard railway system;
3. Monitor rail car information (e.g., acceleration, tilt, geographical location, speed, direction, time) using the tracking device;
4. Detect a change in acceleration using an accelerometer coupled to the rail car;
5. Detect a change in angle using a tilt sensor coupled to the rail car;
6. Identify geographical location of the rail car using a GPS unit coupled to the rail car;

7. Correlate the changes in acceleration an/or tilt to the geographical location;
8. Store rail car information in memory;
9. Transmit rail car information to a depository or tracking station;
10. Store information at tracking station for analysis.

The above sequence of steps uses a unique sensing device for tracking rail car information from a moving rail car unit. The rail car information is stored into memory or transmitted to a tracking station or depository for analysis. This analysis can be used to detect any potential failures in a railway system by way of rail car information. Details of this sequence of steps are provided below using FIG. 5, for example.

Figure 5:
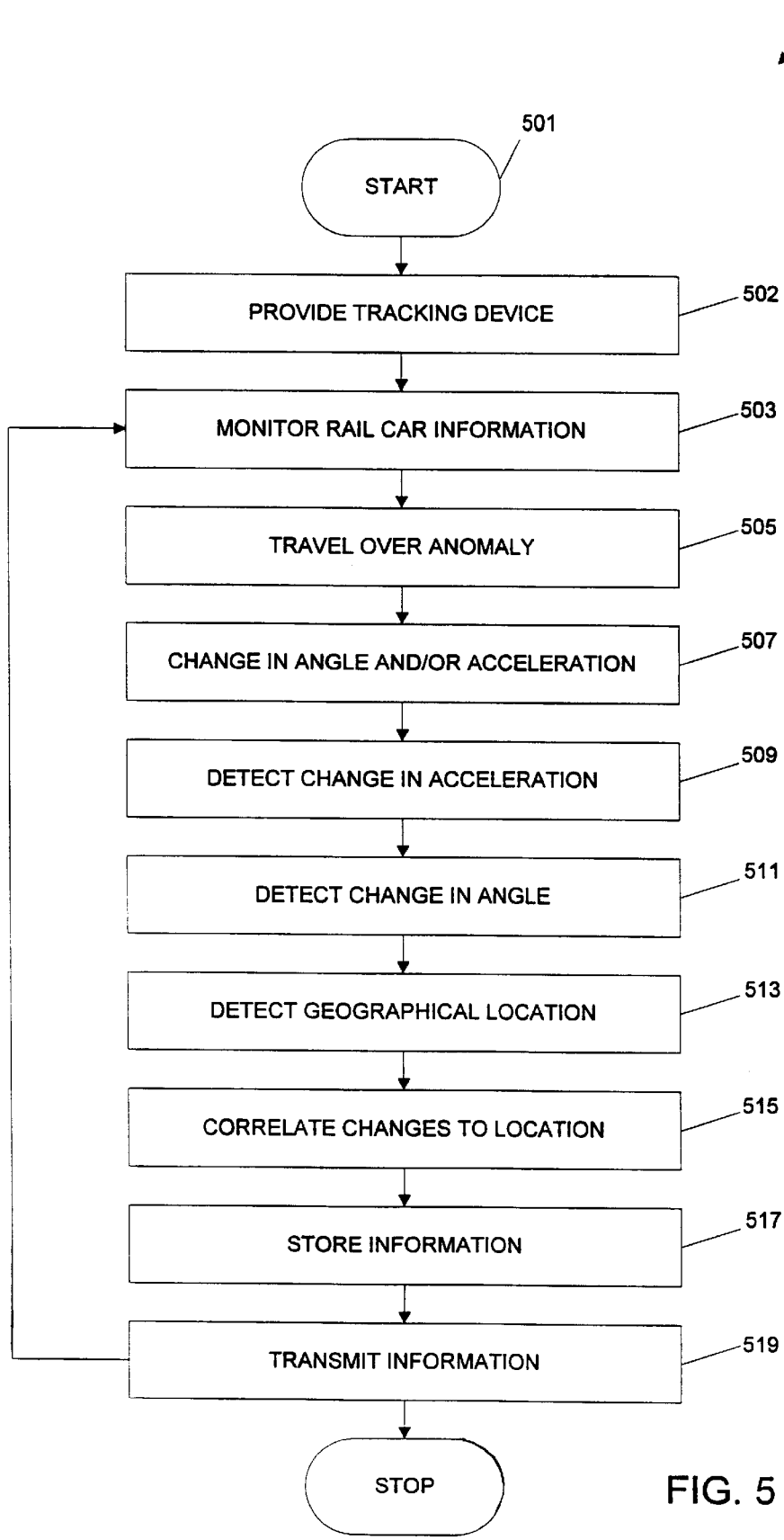
FIG. 5 is a simplified flow diagram of a rail car monitoring method according to the present invention.

FIG. 5 is a simplified flow diagram 500 of a rail car monitoring method according to the present invention. This flow diagram is merely an illustration and should not limit the scope of the claims herein. One of ordinary skill in the art would recognize other modifications, variations, and alternatives.

The method begins at step 501, for example. The method includes a step of providing (step 502) a tracking device on a rail car. The tracking device can be similar to the one described above, but also can be others. The rail car is a unit in a train, which moves the rail car along standard railway system. As the rail car travels down the railway system, the tracking device monitors (step 503) the rail car information (e.g., acceleration, tilt, geographical location, speed, direction, time).

As the rail car travels, it may, at times, travel over an anomaly in the railway system or rail road track, as shown in step 505. In most cases, the rail car deflects a portion of the track as it travels over the anomaly. As the rail car deflects the track portion, the rail car changes in angle and/or acceleration (step 507). The tracking device detects (step 509) changes in acceleration of the rail car using an accelerometer coupled to the rail car chassis. The tracking device also detects (step 511) a change in angle of the rail car using a tilt sensor coupled to the rail car. Geographical location (i.e., latitude and longitude) is detected (step 513) using a GPS unit coupled to the rail car. A processor correlates (step 515) the changes in acceleration an/or tilt to the geographical location of the tracks the location of the track. That is, the geographical location of the anomaly is tracked by way of the GPS sensor.

The tracking device stores the rail car information in memory (step 517). Now, memory from the tracking device can be downloaded at a tracking station for analysis purposes. Alternatively, the tracking device transmits (step 519) the rail car information to a depository or tracking station. In an embodiment, a radio modem can transmit the rail car information to the tracking station. The tracking station stores the information for analysis. Analysis can occur to possibly detect a presence of a defective track from the rail car information.

The tracking device is described in terms of a combination of hardware and software elements. These hardware and software elements are not intended to limit the scope of the claims. One of ordinary skill in the art would recognize that the functionality of the hardware and software elements can be further combined, or even separated, in additional hardware or software features.

The invention has now been explained with reference to specific embodiments. Other embodiments will be apparent to those of ordinary skill in the art in light of the disclosure. In particular, the above hardware and software can be separated by functions for certain applications or further combined, if necessary. It is therefore not intended that this invention be limited, except as indicated by the appended claims.

What is claimed is:

1. A device for monitoring anomalies in a railway system, said device comprising:
   a motion sensor comprising a tilt sensor and an accelerometer operably coupled to a chassis of a rail car to detect an event which may correspond to an anomaly in said railway system;
   a global positioning system (GPS) sensor operably coupled to said chassis to detect a geographical location of said rail car corresponding to said event;
   a processor operably coupled to said motion sensor to direct a signal corresponding to said event, said processor being operably coupled to said GPS sensor to identify said geographical location corresponding to said event of said rail car; and
   a recorder operably coupled to said processor to log said signal which may correspond to said anomaly and said geographical location of said rail car.

2. The device of claim 1 wherein said device is positioned on an upper portion of said chassis to provide a possible greater relative movement than a lower portion of said chassis.

3. The device of claim 1 wherein said tilt sensor provides an intensity measurement of said event, said event being derived from a change in chassis angle greater than about 3°.

4. The device of claim 1 wherein said accelerometer provides an intensity measurement of said event.

5. The device of claim 1 wherein said recorder is selected from a group consisting of a memory, a logger, a hard disk, a microcontroller, a floppy disk, and a dynamic random access memory.

6. The device of claim 1 wherein said processor is selected from a group consisting of a microprocessor, a controller, and a microcontroller.

7. The device of claim 1 wherein said processor and said recorder are provided in a housing.

8. The device of claim 7 wherein said housing is attached to an upper portion of said chassis to provide a possible greater relative movement than a lower portion of said chassis.

9. The device of claim 1 wherein said processor and said motion sensor are provided in a housing.

10. The device of claim 9 wherein said housing is attached to an upper portion of said chassis to provide a possible greater relative movement than a lower portion of said chassis.

11. The device of claim 1 further comprising a display for outputting data.

12. The device of claim 1 further comprising a modem operably coupled to said processor.

13. The device of claim 1 further comprising a radio modem operably coupled to said processor.

14. The device of claim 1 wherein said modem is selected from a group consisting of a cellular modem, and a data modem.

15. The device of claim 1 further comprising an input means operably coupled to said processor.

16. The device of claim 15 wherein said input means is selected from a group consisting of a keyboard, a mouse, and a microphone.

17. The device of claim 1 further comprising a power means operably coupled to said motion sensor for providing power.

18. The device of claim 17 wherein said power means is a photo voltaic array.

19. The device of claim 17 wherein said power means is provided by a power source in said chassis.

20. A method for detecting anomalies in a railway system, said method comprising:

detecting an event from a moving rail car using a motion sensor comprising a tilt sensor and an accelerometer, said event possibly corresponding to an anomaly in a railway system, said motion sensor being operably coupled to a chassis of said moving rail car; and transmitting an event signal corresponding to said event from said motion sensor to a recorder, and transmitting a location signal to said recorder corresponding to a track location of said event, said track location being a geographical location from a global positioning system (GPS) sensor operably coupled to said chassis.

21. The method of claim 20 wherein said motion sensor is positioned on an upper portion of said chassis to provide a possible greater relative movement than a lower portion of said chassis.

22. The method of claim 20 wherein said tilt sensor provides an intensity measurement of said event, said event being derived from a change in chassis angle greater than about 3°.

23. The method of claim 20 wherein said recorder is selected from a group consisting of a memory, a logger, a hard disk, a microcontroller, a floppy disk, and a dynamic random access memory.

24. The method of claim 20 wherein said transmitting of said event signal is provided through a controller, said controller is selected from a group consisting of a microprocessor, a controller, and a microcontroller.

25. The method of claim 24 wherein said processor is operably coupled to an input means.

26. The method of claim 25 wherein said input means is selected from a group consisting of a keyboard, a mouse, and a microphone.

27. The method of claim 20 wherein said motion sensor and said recorder are provided in a housing.

28. The method of claim 27 wherein said housing is attached to an upper portion of said chassis to provide a possible greater relative movement than a lower portion of said chassis.

29. The method of claim 20 wherein said GPS sensor and said motion sensor are provided in a housing.

30. The method of claim 29 wherein said housing is attached to an upper portion of said chassis to provide a possible greater relative movement than a lower portion of said chassis.

31. The method of claim 20 wherein said track location is transferred to said recorder through a microprocessor.

32. The method of claim 20 further comprising displaying said track location through a display.

33. The method of claim 20 further comprising transferring said event signal to a user through a modem.

34. The method of claim 33 wherein said modem is selected from a group consisting of a cellular modem, and a data modem.

35. The method of claim 20 further comprising supplying power to said motion sensor.

36. The method of claim 35 wherein said power is from a photo voltaic array.

37. The method of claim 35 wherein said power is provided by a power source in said chassis.

\* \* \* \* \*